United States Patent [19]

Iijima et al.

[11] Patent Number: 5,418,096
[45] Date of Patent: May 23, 1995

[54] INFORMATION RECORDING MEDIUM AND METHOD OF RECORDING AND REPRODUCING ELECTROSTATIC INFORMATION

[75] Inventors: Masayuki Iijima; Masato Okabe, both of Tokyo, Japan

[73] Assignee: Dai Nippon Printing Co., Ltd., Tokyo, Japan

[21] Appl. No.: 838,456

[22] PCT Filed: Jul. 11, 1991

[86] PCT No.: PCT/JP91/00930

§ 371 Date: Mar. 11, 1992

§ 102(e) Date: Mar. 11, 1992

[30] Foreign Application Priority Data

Jul. 12, 1990 [JP] Japan ................... 3-186033

[51] Int. Cl.6 ............................. G03G 13/04
[52] U.S. Cl. ........................ 430/20; 430/31; 430/48
[58] Field of Search ............. 430/20, 31, 48; 359/72

[56] References Cited

U.S. PATENT DOCUMENTS 4,688,900 8/1987 Doane et al. ................. 359/52
5,155,609 10/1992 Konno et al. ................. 359/72

OTHER PUBLICATIONS

H. G. Craighead et al., New Display Based on Electrically Induced Index Matching in an Inhomogeneous Medium, 1 Jan. 1982, pp. 22–24, Applied Physics Letters 40(1).

*Primary Examiner*—Roland Martin
*Attorney, Agent, or Firm*—Dellett and Walters

[57] ABSTRACT

As shown in FIG. 1a, the information recording medium of the present invention includes an information recording layer on an electrode layer (13), said recording layer made up of a resin system (11) having liquid crystal phases (12) dispersed and fixed therein. In said recording layer, the refractive index of light through said resin system is such chosen as to be substantially coincident with the refractive index of light through the liquid crystal material which is being oriented by an electric field, whereby electrostatic information can be recorded and stored on the recording medium as visible information and the recorded and stored information can be reproduced at any desired time. The present recording medium can also be recycled, if the information recorded on it is erased.

9 Claims, 6 Drawing Sheets

INFORMATION RECORDING MEDIUM AND METHOD OF RECORDING AND REPRODUCING ELECTROSTATIC INFORMATION

TECHNICAL FIELD

The present invention relates to an information recording medium in which a resin system having liquid crystal phases dispersed and fixed therein is used to record and store electrostatic information as visible information and reproduce it at any desired time and to a method of recording and reproducing that information.

BACKGROUND TECHNIQUE

Liquid crystal display elements are now used for the displays of various versions of office automation hardware, inclusive of word processors and laptop computers. They include a liquid crystal layer sandwiched between transparent glass or plastic substrates each having a transparent electrode film, and as voltage is applied between both electrodes using a single or active matrix, they display such information as images. Typical liquid crystal display systems operate in TN, STN, dynamic scattering (operable by current effects) and cholesteric/nematic phase transition modes. A recently developed liquid crystal system, on the other hand, works on a high-molecular/liquid-crystal hybrid mode.

An element having nematic liquid crystals dispersed and fixed in a high-molecular resin system is made transparent by applying voltage thereto with the refractive index of ordinary light through the liquid crystals kept in coincidence with that through the high-molecular resin system, thereby allowing the liquid crystals to line up in the direction of the voltage applied. In the absence of voltage, the liquid crystals do not line up; light incident on the element is scattered on the liquid crystal material/high-molecular resin system interface or through the dispersed and fixed liquid crystal phases, making the element opaque. Thus, this liquid crystal element achieves displays by being made transparent and opaque.

The liquid crystal display element having a nematic type of liquid crystals dispersed and fixed in a high-molecular resin system has advantages of having a large area, a short response, esp., fall time, making effective use of light due to no need of using any polarizer, having a wide and uniform angle of field and being flexible, and so has recently been reported to be well used as window dimming sheets or a projection type of displays. When applied to the projection type of displays or computer displays, their fall time is as short as 1–30 ms and thus advantageous over that of the most commonly used TN or STN type of displays.

Usually, the liquid crystal display element having a nematic type of liquid crystals dispersed and fixed in a high-molecular resin system is used while it is sandwiched between electrodes, and does or does not provide displays by placing the a.c. voltage applied under on-off control. In this case, it has been reported that the voltage vs. light transmittance suffers some hysteresis, giving rise to a transmittance difference between the rise and fall of the a.c. voltage applied. When the a.c. voltage is cut off or in the absence of any voltage, however, the display element is brought back to the initial transmittance or, in other words, the opaque state.

Displaying such information as images is generally achieved by placing the display element sandwiched between matrix electrodes under on-off control per pixel. In addition, it has been put forth to this end to make use of an image-form of patterned electrodes or an image-form of ultraviolet rays which, in this case, are applied to a high-molecular and liquid crystal hybrid film, said high-molecular material being of an ultraviolet setting type, for instance.

On the other hand, cholesteric/nematic phase transition-mode systems are available as display elements having a memory function. Since they are required to be sandwiched between transparent electrodes each having a homeotropic film, the electrodes are required to have a particular structure, correspondingly.

A main object of this invention is to provide an information-recording medium which can make use of a resin system having liquid crystal phases dispersed over and fixed onto an electrode layer to record and store electrostatic information in the form of visible information and reproduce it at any desired time and which can be recycled, if the information recorded on it is erased, as well as to a method of recording and reproducing electrostatic information.

DISCLOSURE OF THE INVENTION

According to one aspect of this invention, there is provided an information recording medium including an information recording layer on an electrode layer, said recording layer made up of a resin system having liquid crystal phases dispersed and fixed therein, which is characterized in that the refractive index of light through the resin system of said information recording layer is so chosen as to be substantially coincident with the refractive index of light through the liquid crystal material which is being oriented by an electric field.

According to another aspect of this invention, there is provided an information recording medium characterized in that said information recording layer is placed on the electrode layer through a charge block layer and/or a charge carrier layer is placed on said information recording layer.

According to the third aspect of this invention, there is provided a method of recording and reproducing electrostatic information, which is characterized by locating an information recording medium in opposition to a photosensitive member having a photoconductive layer on an electrode layer, said recording medium including an information-recording layer on an electrode layer, said recording layer made up of a resin system having liquid crystal phases dispersed and fixed therein, which is characterized in that the refractive index of light through the resin system of said information recording layer is so chosen as to be substantially coincident with the refractive index of light through the liquid crystal material which is being orientated by an electric field, exposing the information to light through said photosensitive member or said information recording medium while voltage is being applied between both said electrodes to record the information, storing the information as visible information and reproducing the stored information at any desired time.

The information-recording medium of this invention, the recording layer of which is formed by dispersing liquid crystals throughout the high-molecular material, enables the low-molecular liquid crystals to be retained in it, achieves an electro-optical effect simply and allows analog information to be recorded and stored on it. Since the liquid crystal phases dispersed in the resin system are not oriented in the initial state, it is also possible to read the recorded and stored information by the contrast between the scattered-light and the transmitted light without recourse to any polarizer.

According to the information recording medium of this invention wherein the information recording layer can be made uniformly thin by a coating technique, it is further possible to keep the gap between the information-bearing charges and the photoconductive layer uniform and small. This in turn enables the recording medium to have an area so large that it can record and reproduce high-resolution images. Furthermore, the recording medium of this invention is kept opaque by light scattering in the absence of an electric field produced by the information-bearing charges, and with an electric field applied to it, its liquid crystal phases are oriented. Therefore, if the refractive index of light through the oriented liquid crystal phases is of the same order as that through the resin system, then the information recorded area is kept so transparent that information reproduction can be done without recourse to any polarizer and an optical reader system can be simplified as well.

In accordance with this invention, it has been found that the recording medium is permitted to have a memory function by dispersing and fixing the liquid crystal phases in the resin. It has also been found that the orientation of the liquid crystal phases in the information recording layer—the storability of visible information therein can be much more enhanced by providing a charge carrier layer on its surface or inserting a charge block layer between the photoconductive layer and the information recording layer, assuring the recorded information can be stored for longer periods of time.

The provision of the charge carrier layer also makes an improvement in terms of how long the information-bearing charges themselves are held, and so enables the electrostatic information to be reproduced either electrically or optically.

BEST MODE FOR CARRYING OUT THE INVENTION

Figure 1A:
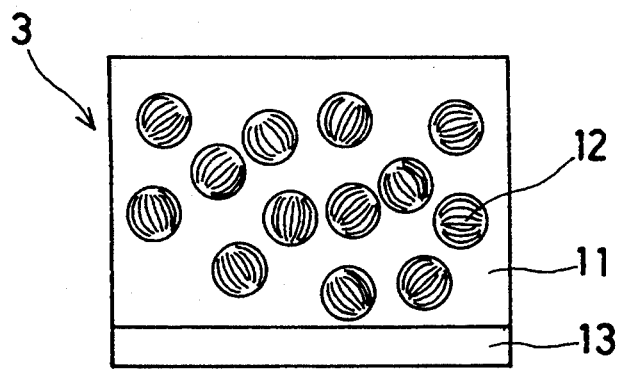
FIGS. 1(a)–1(c) represent one embodiment of the information-recording medium of this invention schematically in section, FIG. 1a being a schematic view of that embodiment before recording information, FIG. 1b a view for illustrating how the information is reproduced after the information has been recorded on the recording medium, and FIG. 1c a view showing another embodiment of the recording medium according to this invention.
Figure 1B:
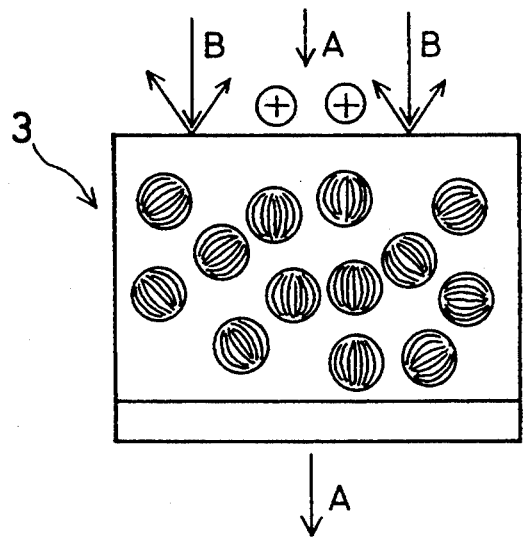
Figure 1C:
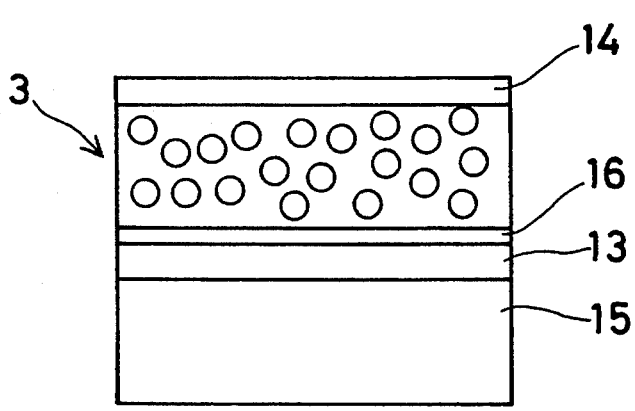

As mentioned just above, FIGS. 1(a)–1(c) represent one embodiment of the information recording medium of this invention schematically in section, FIG. 1a being a schematic view of that embodiment before recording information, FIG. 1b a view for illustrating how the information is reproduced after the information has been recorded on the recording medium, and FIG. 1c a view showing another embodiment of the recording medium according to this invention. Throughout FIGS. 1(a)–1(c), reference numeral 3 stands for an information recording medium, 11 a resin system, 12 a liquid crystal phase, 13 an electrode layer, 14 a charge carrier layer, 15 a support and 16 a charge block layer.

As can be best seen from FIG. 1a, an information recording layer has the low-molecular liquid crystal material 12 dispersed and fixed in the resin system 11. For the liquid crystal material, nematic, smectic and cholesteric liquid crystals or their mixture may all be used.

For instance, the nematic materials used include:
Schiff's base compounds represented by

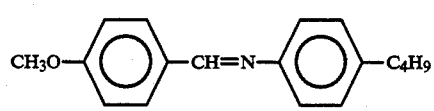

and

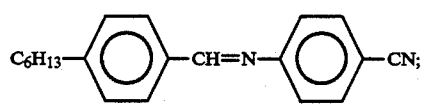

Azoxy compounds represented by

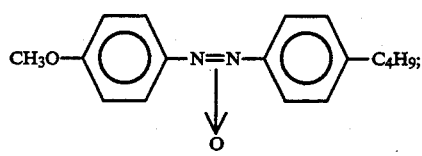

Azo compounds represented by

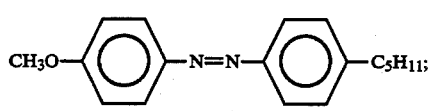

Phenyl benzoate compounds represented by

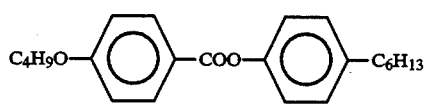

and

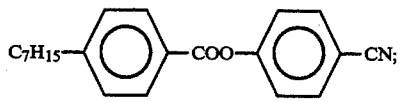

Phenyl cyclohexylic ester compounds represented by

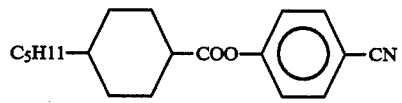

and

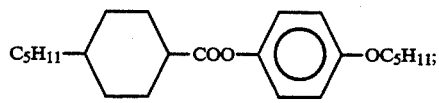

Biphenyl compounds represented by

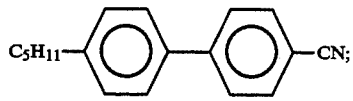

Terphenyl compounds represented by

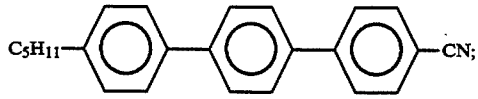

Phenylcyclohexane compounds represented by

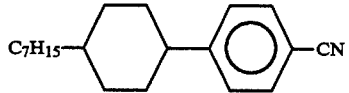

and

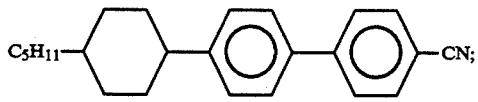

Phenylpyrimidine compounds represented by

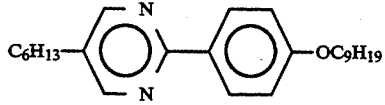

and

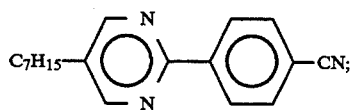

Phenyldioxane compounds represented by

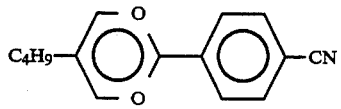

and

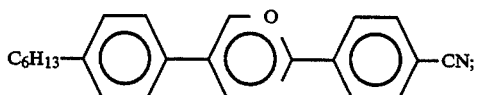

Polycyclic ethane compounds represented by

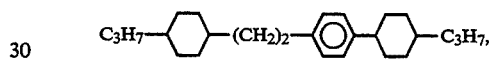

and

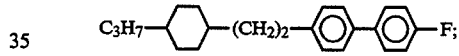

Phenylcyclohexene compounds represented by

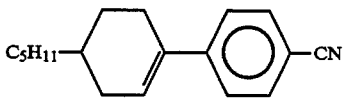

and

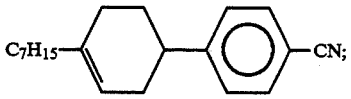

Cyclohexylpyrimidine compounds represented by

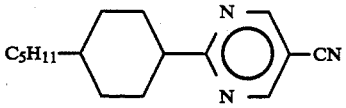

and

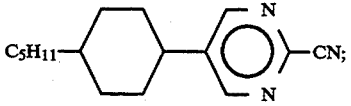

and

Phenyl compounds represented by

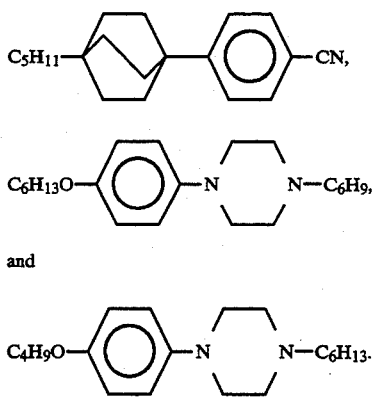

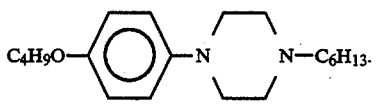

and

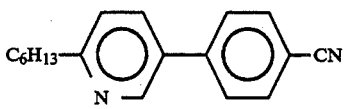

In addition, use may be made of compounds having the following formulae:

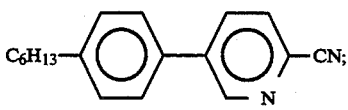

and

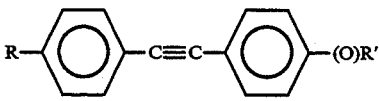

tolane compounds represented by $$R-\bigcirc-C\equiv C-\bigcirc-(O)R'$$

where R and R' each stand for an aliphatic hydrocarbon; and compounds having the following formulae: R—Z—Z—CN or RO—Z—Z—R where R stands for an aliphatic hydrocarbon and Z indicates a benzene, cyclohexane or hereto six-membered ring.

An increased memory function may be achieved by mixing these nematic liquid crystals with smectic or cholesteric liquid crystals.

Bear in mind that it is preferable to chose a liquid crystal material having a high anisotropy of refractive index because there can be a sharp contrast.

For the resin system, use may be made of a solvent-soluble type of resins compatible in a solvent common to the liquid crystal material, e.g., methacrylic, polyester and polystyrene resins or copolymers composed mainly of them. Use may also be made of a radiation-setting type of resins compatible in the monomeric or oligomeric state with the liquid crystal material, e.g., acrylates and methacrylates as well as a thermosetting type of resins, e.g., epoxy and silicone resins. In this connection, it is noted that a microcapsulated mixture of polyvinyl alcohol, etc. with the liquid crystal material may also be used.

For the information recording layer according to this invention, the refractive index of light through the resin system should be such chosen as to be substantially equal to that through the oriented liquid crystals. When there is a large difference in the refractive index of light between them, light is reflected from or scattered by the liquid crystal/resin system interface, rendering it impossible to make the liquid crystals transparent at the time of information recording.

Referring now to the mixing ratio of the liquid crystal material with respect to the resin system, it is desired that the mixture have a liquid crystal material content lying in the range of 10% by weight to 80% by weight, preferably 30% by weight to 60% by weight. Having a liquid crystal material content less than 10% by weight, the mixture goes high in terms of light transmittance when nothing is recorded, so that even when the liquid crystal phases are oriented by information recording, there is a low contrast, and a mixture having a liquid crystal material content higher than 80% by weight is unpreferred due to there being a liquid crystal oozing phenomenon.

When the resin system used is soluble in a solvent, the information recording layer may be formed by dissolving the resin and liquid crystal material in a common solvent and coating the solution onto the electrode layer by ordinary coater equipment such as a blade, roll or spin coater. It appears that as the solvent is dried, the resin solidifies while the liquid crystal material separates into liquid crystal phases having a particle size of a submicron order, which are in turn dispersed and fixed in the resin system. Preferably, the information recording layer has a thickness of 1 $\mu$m to 40 $\mu$m on dry basis.

It is to be noted that when the resin system used is soluble in a solvent or thermosetting, heating should be applied at a temperature lower than the temperature at which the liquid crystal material is held in a random state or transformed into a so-called isotropic phase. When the resin is dried and solidified while it remains transformed into the isotropic phase, neither crystallinity nor any electro-optical effect is achieved. The reason would be that with the resin dried at higher temperatures, no sufficient phase separation takes place, causing the drying of the resin to proceed while it remains compatible with the liquid crystals.

The electrode layer 13 may be formed of any desired material, if it has a specific resistance value of $10^6$ $\Omega$.cm or less. For instance, use may be made of electrically conductive films of metals, inorganic metal oxides and organic materials such as quaternary ammonium salts. Such an electrode may be formed on the support as by vapor deposition, sputtering, CVD, coating, plating, dipping or electrolytic polymerization. Although the electrode's thickness must be varied in dependence on the material forming the electrode and the voltage applied to the electrode for recording information, it may be of the order of 100 to 3000Å, for instance in the case of an ITO film. Bear in mind that the electrode layer 13 is formed on the entire surface of the support across the information recording layer or according to the pattern of the information recording layer formed.

Recording information on the thus formed information-recording medium of this invention may be achieved by applying information-bearing charges to the surface of the information recording layer, as depicted in FIG. 1b, to establish an electric field between them and the electrode layer, whereby the liquid crystal layers present on the information-recording region are oriented in the direction of the electric field. When the thus recorded and stored information is reproduced as by transmitting light, light A transmits through the information recorded area in which the refractive indices of light through the resin system and liquid crystals coincide with each other, but light B is scattered by an information free area, making a contrast with the information-recorded area.

The support 15 serves to support the strength of the information-recording medium, and may not be provided when the information-recording layer is of a self-supporting type. No critical limitation is imposed on the material and thickness of the support 15, if it has a certain strength enough to support the information recording layer. For instance, use may be made of flexible plastic films or rigid sheets such as glass or plastic sheets. To be more specific, when the information recording medium is in flexible film, tape, disk or card form, a flexible plastic film may be used. For applications where strength is demanded, rigid sheets or inorganic materials such as glass may be used.

It is to be understood that when the information is reproduced by transmitting light, the support may be made antireflective, if required, by laminating onto its other side a film having an antireflective effect and/or regulating the thickness of the support so as to permit it to have an antireflective effect.

Including the resin system having the liquid crystal material dispersed and fixed therein and laminated onto the electrode layer, the information recording medium of this invention is designed to record and store electrostatic information in a state where it remains visualized by the orientation of the liquid crystals. Conventional TN and STN types of liquid crystal cells having liquid crystals sandwiched between their electrodes or ordinary cells having liquid crystal phases dispersed and fixed in a high-molecular resin system lack any memory function, because they return to the original state upon voltage removal.

According to the information recording medium of this invention, information can be electrostatically recorded and stored, with gradation, on one side of the electrode layer-free information recording layer that is opposite to the electrode layer 13. The visible information, once recorded, cannot disappear even upon removal of the electrostatic charges, and can be stored, although when gradating information is recorded, there is a variation in the gradation reproduced. The reason still remains unclear, but when a d.c. voltage is applied a cell having the present information recording medium sandwiched between electrodes, that cell does not have any memory function and, like conventional liquid crystal cells, operates instantaneously on receipt of the voltage, but its transmittance returns substantially to its initial state within a short span of time due to dielectric relaxation. Instantaneously on removal of the voltage, it again responds but again returns to its initial state. Therefore, the information recording medium of this invention has an electrode layer on its one side alone. With the present information-recording medium of this invention, it is thus possible to record information either by corona charging—which permits the information to be recorded on the electrode layer-free side of the recording medium, or by air discharge or field emission—which occurs on the basis of Paschen's law, when voltage is applied between the electrode of the recording medium and an opposite-electrode located with an air gap between them. The most preferred method of recording information involves exposing the information to light simultaneously with applying voltage between the electrode of the recording medium and the electrode of a photosensitive material having a photoconductive layer, which is located in opposition thereto with an air gap-therebetween, whereby an image with gradation can be recorded by the intensity of light information.

This memory function may be enhanced by heating the information recording medium at the time of recording information. The temperature at which the recording medium is heated must be higher than room temperature to lower than the temperature at which the liquid crystal material is transformed into an isotropic phase. When heated at a temperature higher than the isotropic phase transition temperature, the recording medium becomes transparent and the liquid crystal material loses its own liquid crystal properties. This heating is preferably done at a temperature at which the once information recorded medium is so clouded that the information can return to the original initial state. The detailed reason, which has yet to be clarified, would be that the liquid crystal material undergoing phase separation interacts with the interface of the resin system, giving rise to a memory function. Thus; it is preferred that the recording medium is first heated to a temperature at which the interaction of the liquid crystal phases with the interface of the resin system does not occur or, in other words, the critical temperature at which such interaction varies largely, and the information is then recorded at a temperature slightly lower than that, at which such interaction is increased. Therefore, the heating temperature can optionally be determined depending on composition, compositional ratio, etc. This interaction of the interface continues even when the medium is allowed to stand for a while under cooling conditions.

When information is recorded on the information recording medium of this invention by applying voltage between its electrode and an electrode having an electrically conductive layer patterned thereon with an air gap between them, it has been found that the information is resolved in a region where 6-$\mu$m wide electrically conductive lines alternate with 6-$\mu$m wide space lines. Resolution has a close relation to the thickness of an information recording medium. However, the thickness accuracy of the recording medium according to this invention has been well controlled in coating the information recording layer; that is, not only can any spacer for gap control be dispensed with—this is needed for laminating or sealing processes in which a recording medium is sandwiched between the associated electrodes, but there is no defect as well, even when high-resolution information is recorded thereon.

Since the once recorded visual information is erased by heating the recording medium to the critical temperature at which the interaction of the high-molecular resin system with the interface of the dispersed and fixed liquid crystal phases varies largely or higher, the recording medium can be recycled.

The visual information is also erased by heating the recording medium to the isotropic phase transition temperature of the liquid crystal phase or higher. In this case, however, the recording medium is first made transparent and then restored to the original clouded or opaque state upon cooling.

According to the information recording medium of this invention, it is also preferred that a charge carrier layer be provided on the surface of the information recording layer, as illustrated in FIG. 1c, whereby the orientation of liquid crystals due to the electric field effect can be improved while inhibiting attenuation of information-bearing charges during recording, and the electrostatic information stored on the charge carrier layer can be reproduced electrically.

Such a charge carrier layer is made up of a high-insulating resin so as to inhibit migration of electrostatic charges, and should have an insulating property of at least $10^{14}$ Ω.cm in terms of specific resistance and be transparent. For instance, such resins may include fluoroplastics, e.g., polytetrafluoroethylene, fluorinated ethylenepropylene or tetrafluoroethylene-perfluoroalkyl vinyl ether copolymers; polyimide resins, polyethyl ether ketone resins; and poly-paraxylenes. In order to form the charge carrier layer, the resin may be applied on the information recording layer as by vapor deposition or sputtering, or coating or dipping of a solution of the resin in a solvent. The charge carrier layer may be obtained by bonding a film of the above polymer onto the information recording layer through an adhesive as well. Preferably, the charge carrier layer may have a thickness lying in the range of 1 μm to 40 μm.

Further, it is preferable that a charge block layer be inserted between the electrode layer and the information-recording layer.

The charge block layer prevents charges from being injected from the electrode layer and so has an effect on keeping opposite charges from being injected from the electrode layer and retaining an electric field. This charge block layer may be made up of the same material as is the case with the above charge carrier layer, and may have a thickness enough to prevent the occurrence of a charge tunnelling phenomenon, say, at least 1000Å.

The charge carrier layer and/or the charge block layer may contain photoconductive or elecrically conductive fine particles as well.

Now, reference will be made to how to record information on the information recording medium of this invention and reproduce it.

One example of recording information is illustrated in FIGS. 2(a)–2(d), wherein reference numeral 1 stands a photosensitive material, 5 a photoconductor support, 7 an electrode of the photosensitive material, 9 a photoconductor layer and 17 a power source.

The transparent electrode 7 made up of a 1000-Å thick indium tin oxide (ITO) is first formed on the photoconductor support 5 built up of a 1-mm thick glass, and the photoconductor layer 9 of about 10 μm in thickness is then formed on the electrode to constitute the photosensitive material 1.

Figure 2A:
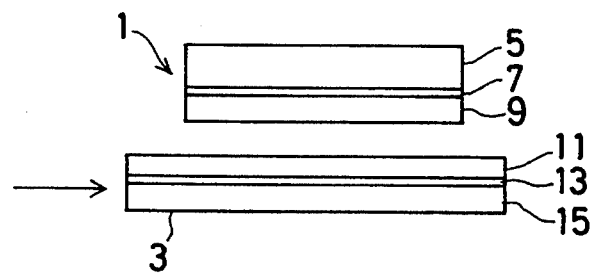
FIGS. 2(a)–2(d) illustrate how to record information with a photosensitive member.
Figure 2B:
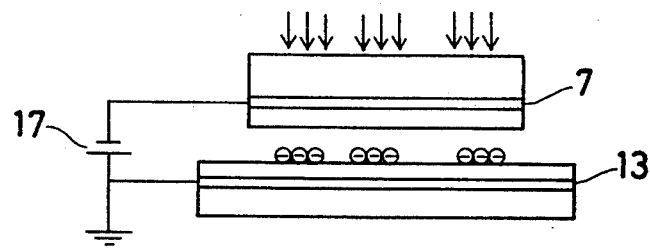
Figure 2C:
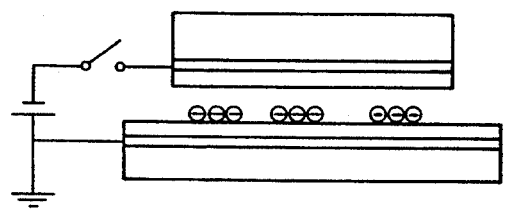
Figure 2D:
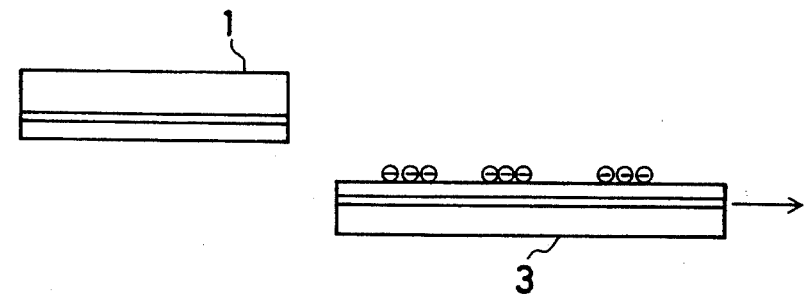

As illustrated in FIG. 2a, the above-described information recording medium 3 is arranged in opposition to the photosensitive material 1 with an air gap of ca. 10 μm.

Then, the power source 17 applies voltage between the electrodes 7 and 13. In a dark place the photoconductor layer 9 could behave as a high resistor.

With light 18 incident on the recording layer through the photosensitive member 1, the area of the photoconductor layer 9, on which the light strikes, is allowed to show electrical conductivity and behave as a low resistor, so that information-bearing charges are built up on the recording layer and the liquid crystals line up at the area of the recording layer on which the charges have been built up. Even in the presence of uniform "fogging" charges, further accumulation of charges takes place at the light-incident area, enabling the information to be recorded by the contrast with the unexposed area.

Since some liquid crystals operate at low voltage, it is preferable to form the information-bearing charges by using a voltage load lying in the operating range of the information recording layer. This is achieved by suitable selection of voltage loads across the photosensitive member, air gap and the recording layer.

It is to be noted that the memory function of the present information recording medium may be further enhanced, if it is heated as by passing a current through the electrode layer in the course of recording information thereon.

This recording method may be achieved by planar analog recording, which gives high resolution as is the case with silver salt photography because of orientation at a liquid crystal particle level, and enables the exposure pattern to be stored while remaining visualized by the orientation of the liquid crystal phases.

Input of information to the information recording medium according to this invention may be achieved by using either a high-resolution electrostatic camera or laser. Information-bearing light may be allowed to be incident through either the photosensitive material or the information recording medium.

With the electrostatic camera, a recording member is built up of the photosensitive material 1 and information recording medium 3, rather than of a photographic film used with an ordinary camera. For this electrostatic camera either a mechanical shutter or an optical shutter may be used.

Alternatively, the light information may be separated through a prism or color filter into R, G and B light components in the form of parallel light beams, which may be used with three electrostatic information recording media to form one frame, or which may be focused onto one plane to form R, G and B images to form one frame, for the purpose of picking up color images.

For recording the electrostatic information by laser, an argon (514.488 nm), helium-neon (633 nm) or semiconductor (780 nm, 810 nm, etc.) laser may be used as a light source. For voltage application, the photosensitive material and the information recording medium may be brought into planar contact with each other or spaced away from each other with a certain space therebetween. In this state, laser exposure corresponding to image, character, cord or line signals by scanning. Recording analog information like images is done by modulating the intensity of laser light, while recording digital information like characters, cords or line images is done by placing laser light under on-off control. A dotted image, on the other hand, is formed by placing laser light under dot generator on-off control. Note that the spectral characteristics of the photoconductive layer in the electrostatic information recording medium need not be panchromatic and may be sensitive enough to the wavelength of a laser light source.

Recording information on the information recording medium of this invention may be achieved not only by using such a photosensitive material but also by information writing using, for instance, corona charging, pin electrodes, ion flow heads, electron beams and ion driving. In the latter case, the information-bearing charges are imparted directly onto the surface of the information-recording medium.

The information recorded by the orientation of liquid crystals is a visual type of information that can be seen with the naked eye, or may be read on a magnified scale through a reflection type of projector. Further, this invention may be read, with high accuracy, either by laser scanning or by the reflected or transmitted light using CCDs.

The present invention will now be explained more specifically with reference to the following examples.

Example 1

Dissolved in 1,2-dichloroethane were 0.2 g of a cyanobiphenyl compound type of liquid crystal ("E44" made by BDH, $\Delta n=0.262$ and N-I transition found at 100° C.) and 0.3 g of PMMA ("BR" made by Mitsubishi Rayon Co., Ltd.) to prepare a 10% by weight solution, which was then coated by a blade coater onto an indium tin oxide (ITO) electrode of 1000Å in thickness laminated onto a 1-mm thick glass substrate by sputtering and then dried for 1 hour in an oven held at 80° C. to prepare an information recording medium according to this invention. The information recording layer was white and opaque and had a thickness of 8 μm.

Figure 3:
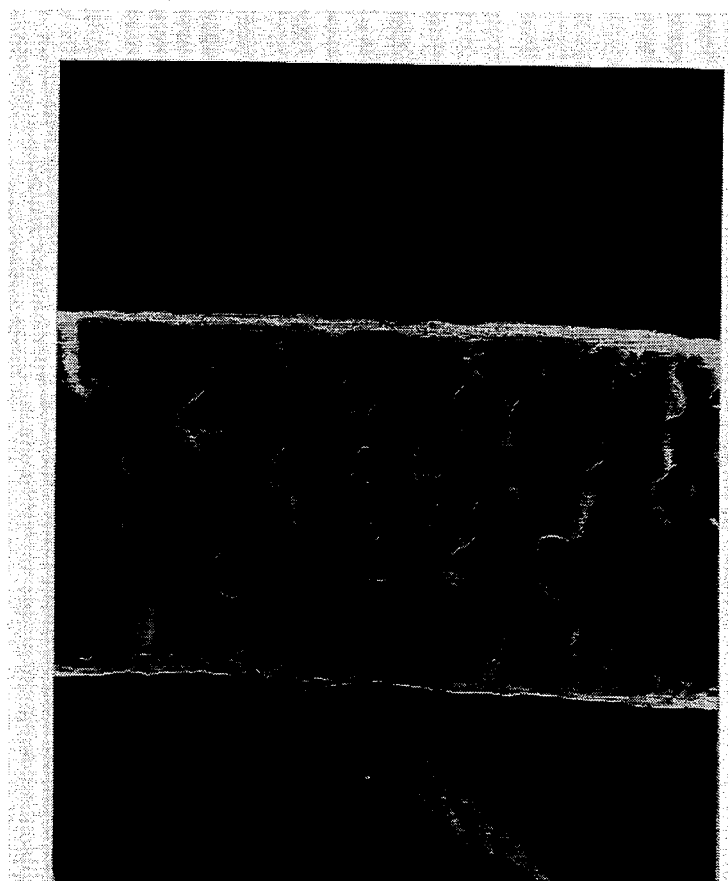
FIG. 3 is a cross-section electron micrograph showing a particle structure of the liquid crystal phases of the information-recording layer of the information recording medium according to this invention.

Apart from this medium, an information recording medium of 40 μm in thickness was again prepared and extracted with a solvent. A cross-section electron micrograph (of 1000 magnifications) of the recording medium has confirmed that liquid crystal phases (which look like holes) are separated from each other in the PMMA, as can be best seen from FIG. 3.

The thus prepared information-recording medium was charged on its surface to +30 volts to +160 volts by corona charging to measure the optical density of the charged area vs. the quantity of charging with a microdensitometer (made by Konika K.K.). The results are graphically shown in FIG. 4 with an optical density difference with the glass having ITO as ordinate.

Figure 4:
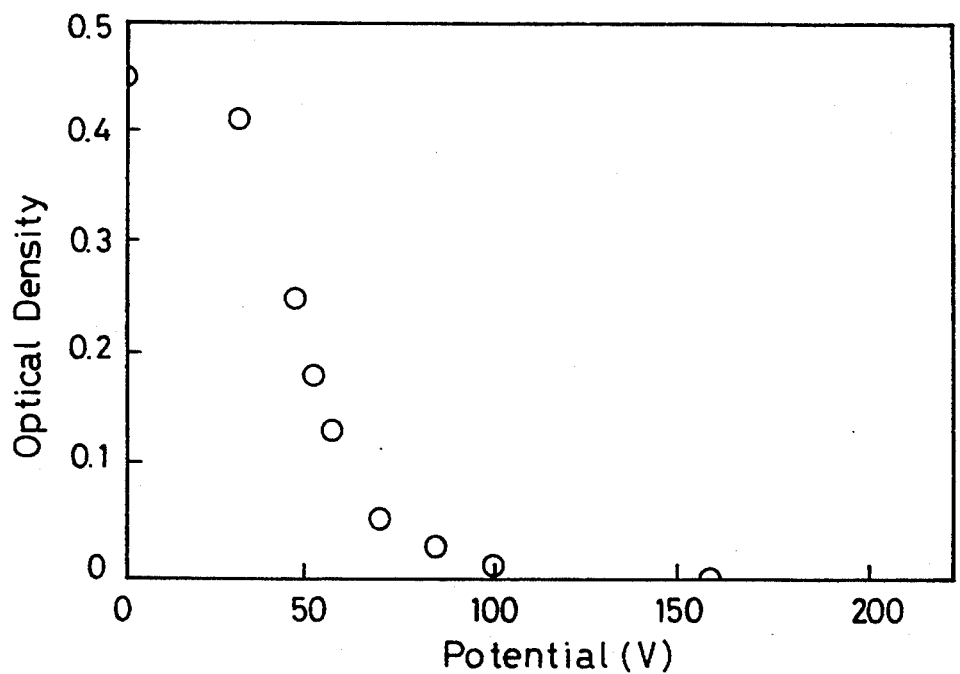
FIG. 4 illustrates graphically the relation between the potential charged on the recording medium of this invention and the optical density of the information recorded area.

FIG. 4 reveals that the liquid crystal phases in the recording layer of the information recording medium according to this invention are oriented by the surfaces charges and line up differently depending upon the intensity of the electric field applied, thus making it possible to express halftone.

Immersion of the recording medium with the information recorded on it in water or allowing it to stand at room temperature resulted in disappearance of the surface charges, but the transmittance shown in FIG. 4 was nonetheless kept. This indicates that the recording medium of this invention can keep the information stored on it even in the absence of any electric field or, in other words, permanently.

Heating the recording medium with the information recorded on it to 70° C. caused the information recorded area to lose transparency and turn white and opaque.

Example 2

Two recording media, one being the recording medium as prepared in Ex. 1 and the other the recording medium of Ex. 1 which was further heated to about 70° C. on a hot plate, were each charged to +150 volts by corona charging.

In order to investigate the effect of heating prior to corona charging, a densitometer measurement was taken of the optical densities of the charged area just after charging and that which was immersed in water after charging to clear it of the surface charges. The results are set out in the following table.

|  | Just After Corona Charging | Immersion in Water |
| --- | --- | --- |
| Before Corona Charging; and No Heating Applied | 0.0 | 0.35 |
| Before Corona Charging; and Heating to 60° C. | 0.0 | 0.12 |

Optical density: Difference with that of glass having ITO

Optical density in an off state: 0.45

The above table reveals that heating the information recording medium prior to recording improves on its memory function. A preferable heating temperature is 60° C. or higher with the effect due to heating continuing for a while after cooling the medium down to room temperature. Heating the recording medium with the information recorded on it to 70° C. resulted in the information recorded area losing transparency and turning white and opaque. The then optical density was found to be 0.45, equal to that of the recording medium which is not charged.

Example 3

Preparation of Photosensitive Member

Fifteen (15) parts by weight of p-diethylaminobenzaldehyde-N-phenyl-benzylhydrazone serving as a charge-transport material and 10 parts by weight of a polycarbonate resin (sold by Mitsubishi Gas Chemical Co., Ltd. under the trade name of "Yupiron S-100) were dissolved in a 4:6 mixed solvent of dichloromethane and 1,1,2-trichloro-ethane to prepare a solution regulated to a solid matter content of 17.8%, which was then coated onto an ITO transparent electrode (having a thickness of about 500Å and a resistance value of 80Ω/sq.) on a glass substrate with the use of a 2-mil gap thickness blade coater and dried at 80° C. for 2 hours to form a charge-transport layer of 10 μm in thickness.

Next, 3 parts by weight of a bisazo dye serving as a charge-generating material and having the following formula:

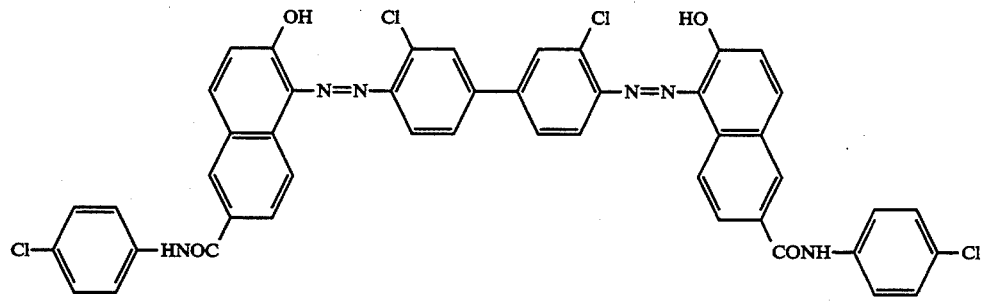

and 1 part by weight of a polyvinyl acetal resin were dissolved in a 1:1 mixed solvent of dioxane and cyclohexanone to prepare a solution regulated to a solid matter content of 2%, which was in turn coated onto the above charge-transport layer with a 2-mil gap blade coater and dried at 100° C. for 1 hour to prepare a photosensitive member having a charge-generating layer of 0.3 μm in thickness.

As illustrated in FIGS. 2(a–2(d), this photosensitive member was arranged in opposition to the information recording medium of Ex. 1 with an air gap of 9 μm between them, and a gray scale was projected and exposed to light for 0.1 second with a voltage of 750 volts applied between the electrodes of the photosensitive member and the recording medium. The quantity of exposure vs. the optical density of the recording medium, as measured according to Ex. 1, is graphically illustrated in FIG. 5.

Figure 5:
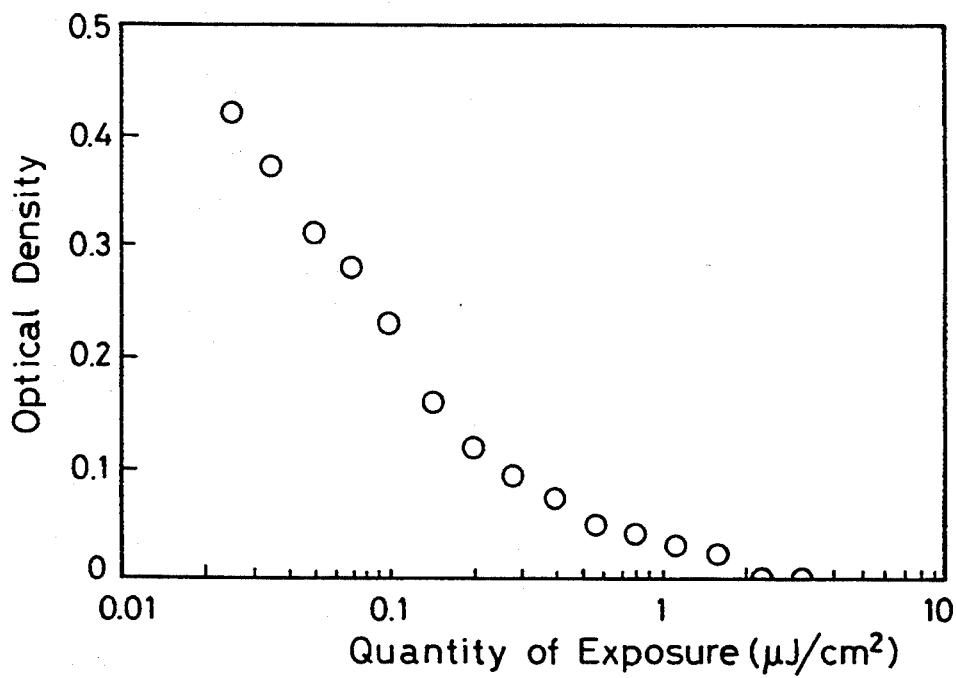
FIG. 5 illustrates graphically the relation between the quantity of exposure and the optical density on the information-recorded region, when electrostatic information is recorded using a photosensitive material.

FIG. 5 reveals that with the information-recording medium of this invention, the information can be again recorded depending upon the quantity of exposure, even in an electrostatic information recording manner using the photosensitive member in opposite relation thereto.

Instead of using the gray scale, a negative image of a silver salt photograph was projected and exposed to light, and the obtained information recording medium was printed out by a read printer using a film scanner (made by Nikon Co., Ltd.). As a result, it was found that a positive image having a gradation corresponding to that of the negative image could be reproduced.

Example 4

Figure 6:
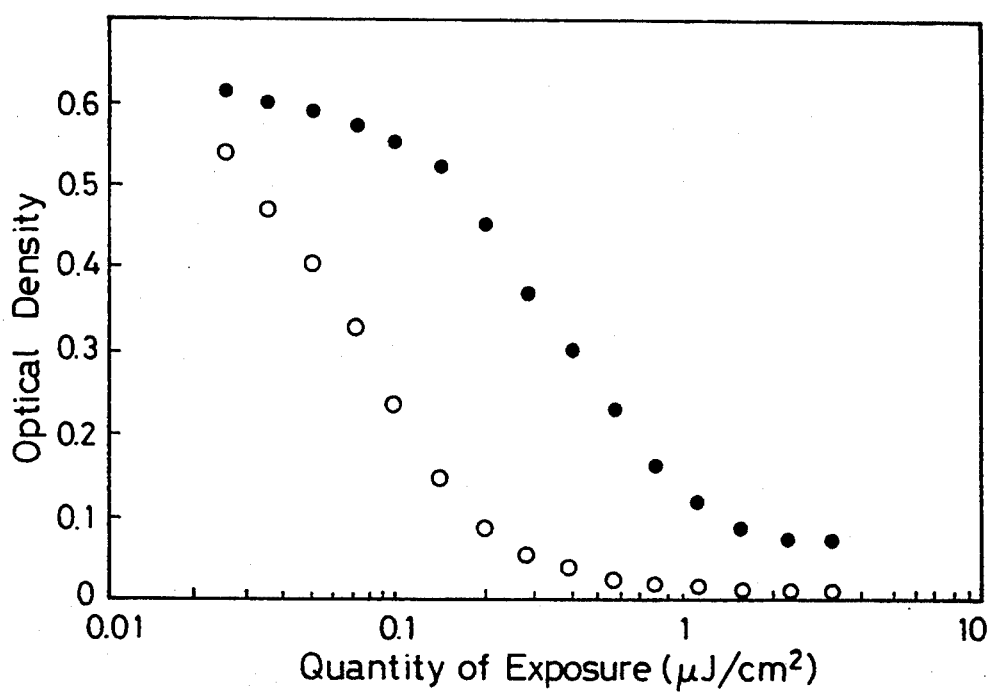
FIG. 6 illustrates graphically the effect of heating on record storability, said heating being done before recording information on the information recording medium of this invention, and the influence of the presence of surface charges of the information recorded area on record storability.

A recording medium prepared as in Example 1 was heated to about 70° C. on a hot plate and a gray scale was projected and exposed to light as in Example 3. The optical density of the recording medium, as measured, is plotted with white spots in FIG. 6., and the optical density of the recording medium, as measured after it had been cleared of the surface charges, is plotted with black spots in the same graph. As can be seen from FIG. 6, there is a drop of transmittance due to disappearance of the surface charges, but the gradation corresponding to the quantity of exposure (or of electrification) is maintained.

Example 5

A recording medium prepared as in Example 1 was heated to about 70° C. on a hot plate and then charged at +200 volts by corona charging to investigate changes-with-time in the optical density of the charged area. The results are plotted in FIG. 7 with white, black and square spots when the recording medium was kept at 23° C., 33° C. and 38° C., respectively. As can be seen from FIG. 7 with logarithms as abscissa, there are observed straight lines with gradients varying dependent upon the temperatures.

Figure 7:
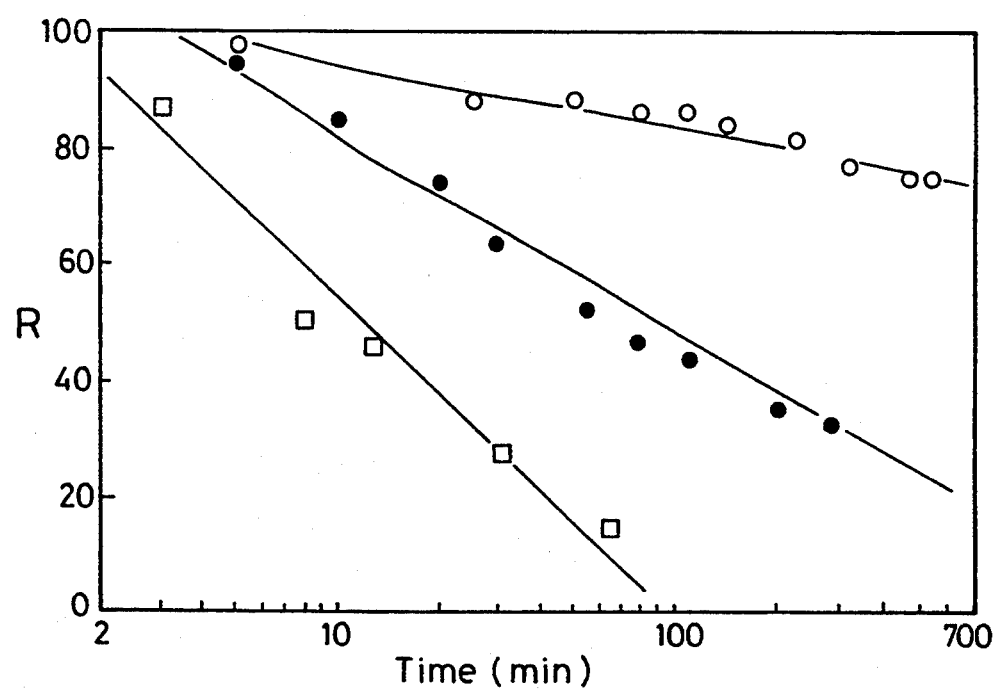
FIG. 7 illustrates graphically the influence of the temperature at which the information recording medium of this invention is kept as a result of heating on the record storability, said heating being done before recording information on the recording medium.

In FIG. 7, the optical density (R) on the ordinate is found by $$C_t - C_{off}/C_o - C_{off} \times 100.$$

Here $C_t$ is the optical density of the medium at a time t, $C_o$ is the optical density of the medium just after charging and $C_{off}$ is the optical density of the medium when voltage supply is put off.

Example 6

Figure 8:
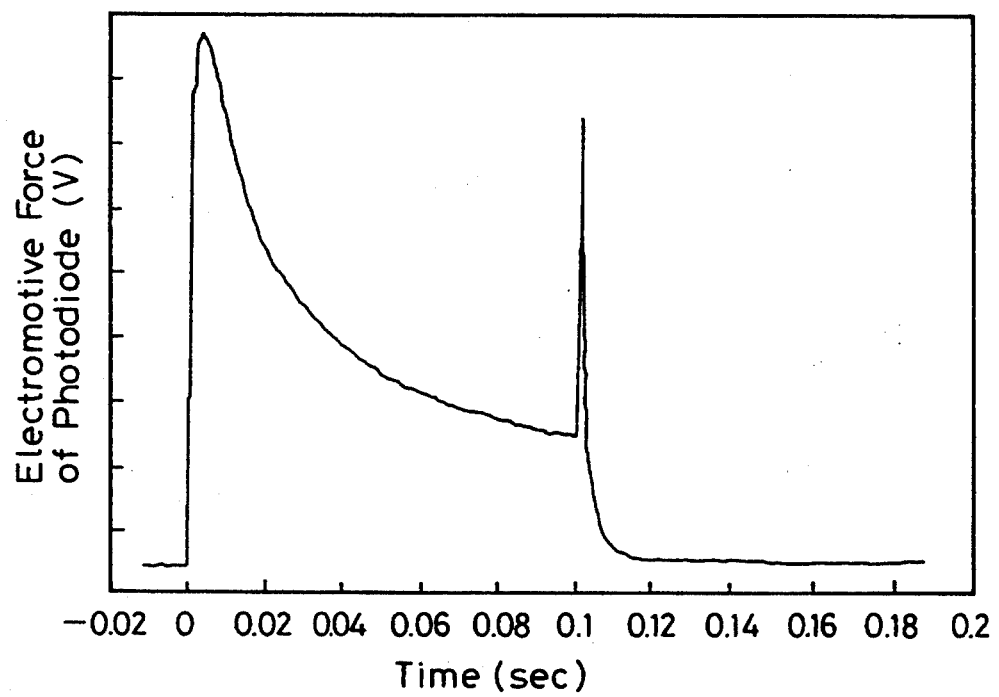
FIG. 8 illustrates how information is recorded on the information recording medium of this invention in which the information recording layer is provided with an electrode layer on its surface.

Gold was vapor-deposited onto the surface of a recording medium as in Ex. 1 to form an electrode. Then, a d.c. voltage of 200 volts was applied across this medium for 0.1 second to detect the transmitted light of an He-Ne laser with a photodiode. The results are shown in FIG. 8 with the electromotive force (V) of the photodiode as ordinate and time (seconds) as abscissa.

When the voltage is applied (or at t=0), the transmittance of the recording medium increases sharply; however, because the resistance of the liquid crystal area is lower than that of the binder resin, the effective voltage loaded on the liquid crystals and hence the transmittance of the recording medium drops with the lapse of time ($0 \leq t \leq 0.1$). When the d.c. voltage is put off (or at t=0.1), the voltage loaded on the binder resin is redistributed to the liquid crystal area, giving rise to an instantaneous increase in the transmittance of the medium, but that transmittance soon diminishes and returns to the level before voltage loading.

Thus, when a d.c. voltage was applied on the recording medium of Ex. 1 which was further provided with electrodes on both its sides, its transmittance dropped due to its inside dielectric relaxation even when it was loaded with voltage, and returned to the level before voltage supply simultaneously with the voltage put off.

Example 7

A recording medium prepared as in Ex. 1 was located in opposition to an electrode patterned in a 6-μm line array of 6-μm spacing on a glass substrate, and a d.c. voltage of 750 volts was applied across the electrode of the recording medium and the patterned electrode for 0.1 second. As a result, it was confirmed that the 6-μm lines and spacings were resolved on the recording medium. It was also confirmed that a certain resolution was maintained even after this recording medium had been immersed in water for charge removal.

Example 8

A 5% solution of a fluoroplastic (sold by Asahi Glass Co., Ltd. under the trade name of "Cytop") in a fluorine-based solvent was spin-coated onto an information-recording layer prepared as in Ex. 1 (at 1500 rpm for 30 seconds), then allowed to stand at room temperature for 1 day and finally dried in an 80° C. vacuum oven to form a charge carrier layer of about 0.5 μm in thickness. In this way, an information-recording medium of this invention was prepared.

Electrostatic information was recorded on this information recording medium as in Ex. 3. In consequence, it was confirmed that the same recording as in Ex. 3 could be done.

Even after this information recording medium had been allowed to stand at room temperature for 20 days, the visible image could be maintained, and could be read as information-bearing charges on a surface potentiometer as well.

Example 9

A 20% solution of a rosin ester resin ("Steberite Ester 10" made by Rika Hercules Co., Ltd.) in hexane was spin-coated onto an information recording medium prepared as in Ex. 1 (at 2000 rpm for 30 seconds) and then dried in a 60° C. oven for 2 hours to form a charge carrier layer of about 0.7 μm in thickness. Then, finely divided a-Se particles were deposited onto the surface of this charge carrier layer with vacuum deposition equipment ("VPC-410" made by Sinku Kikoh K.K.) under the following conditions.

First, the glass surface of the above medium was fixed, while in contact with, on a heating substrate holder housed within a vacuum chamber, and the substrate holder was then heated to 70° C. at a vacuum degree of 6 torr. Finally, a-Se in the form of fine particles was provided in the vicinity of the surface of the charge carrier layer by resistance heating, thereby preparing an information-recording medium of this invention.

Next, electrostatic information was recorded on this information recording medium as in Ex. 3. In consequence, the same recording as in Ex. 3 could be done.

Even after this information recording medium had been allowed to stand at room temperature for 20 days, it was found that not only was the visible image maintained but the surface potential was kept as well, because it could be reproduced on a surface potentiometer.

Example 10

A 5% solution of a fluoroplastic ("Cytop" made by Asahi Glass Co., Ltd.) in a fluorine-based solvent was spin-coated onto a 1000-Å thick ITO electrode laminated onto a 1-mm thick glass substrate by sputtering (at 1500 rpm fop 30 seconds), then allowed to stand at room temperature for 1 day and finally dried in a 150° C. oven for 3 hours to form a layer of about 0.5 $\mu$m in thickness, which was in turn plasma-treated to form a charge block layer. This charge block layer was then provided thereon with a 10% by weight solution of 0.2 g of a cyanobiphenyl compound type of liquid crystal ("E44" made by BDH, $\Delta$n=0.262 and N-I transition found at 100° C.) and 0.3 g of PMMA ("BR" made by Mitsubishi Rayon Co., Ltd.) in 1,2-dichloromethane by means of a blade coater, and the resulting coat was dried for 1 hour in an oven held at 80° C. to form a white and opaque information recording layer of about 8 $\mu$m in thickness. In this way, an information recording medium of this invention was prepared.

Electrostatic information was recorded on this information recording medium as in Ex. 3. In consequence, it was confirmed that the same recording as in Ex. 3 could be done.

A 5% solution of a fluoroplastic ("Cytop" made by Asahi Glass Co., Ltd.) in a fluorine-based solvent was spin-coated onto the information recording layer of this recording medium (at 1500 rpm for 30 seconds), then allowed to stand at room temperature for 1 day and finally dried in an 80° C. vacuum oven to form a charge carrier layer of about 0.5 $\mu$m in thickness. The thus obtained information recording medium of this invention was used to record electrostatic information as in Ex. 3. As a result, it was confirmed that the same recording as in Ex. 3 could be done.

Even after this information-recording medium had been allowed to stand at room temperature for 20 days, it was found that not only was the visible image maintained but the surface potential was kept as well, because it could be reproduced on a surface potentiometer.

INDUSTRIAL APPLICABILITY

The information recording medium of this invention can record and store electrostatic information as visible information, enables the information recorded on it to be reproduced at any desired time, and can be recycled, if the information recorded on it is erased.

What is claimed is:

1. A method of recording and reproducing information, which is characterized by:
    locating an information recording medium in opposition to a photosensitive member having a photoconductive layer on an electrode layer with an air gap therebetween, said recording medium including an information recording layer on an electrode layer, said recording layer being made up of a resin system having liquid crystal phases dispersed and fixed therein, in which the refractive index of light through said resin system is chosen so as to be substantially coincident with the refractive index of light through the liquid crystal material as oriented by an electric field,
    exposing said photosensitive member to patterned light, as patterned per the information, the patterned light of said exposure being directed through said photosensitive member or said information recording medium while voltage is being applied between both said electrodes so as to influence select liquid crystals of said information recording layer in accordance with the patterned illumination for recording the information as visible information,
    storing said information recording medium with the recorded visible information alone, and
    reproducing the recorded information from said information recording medium at any subsequent time.

2. A method of recording and reproducing information, which is characterized by:
    locating an information recording medium in opposition to a photosensitive member having a photoconductive layer on an electrode layer with an air gap therebetween, said recording medium including an information recording layer on an electrode layer, said recording layer being made up of a resin system having liquid crystal phases dispersed and fixed therein, in which the refractive index of light through said resin system is chosen so as to be substantially coincident with the refractive index of light through the liquid crystal material which is being oriented by an electric field,
    exposing the information to light through said photosensitive member or said information recording medium while voltage is being applied between both said electrodes to record the information,
    storing the information recording medium having visible information thereon alone, and
    reproducing the stored information at any desired time,
    wherein prior to recording the electrostatic information on said information recording medium, said information recording medium is heated to higher than room temperature to below the isotropic phase transition temperature of the liquid crystal material.

3. A method of recording and reproducing information as claimed in claim 1, wherein said recorded visible information is reproduced by transmitted or reflected light.

4. A method of recording and reproducing information according to claim 1, wherein said exposure step establishes an electrostatic charge distribution providing said influence upon the select crystals of said information recording layer in accordance with the patterned illumination.

5. A method of recording and reproducing information according to claim 1, further comprising heating said information recording medium by passing a current through its associated electrode layer during the course of recording information thereon.

6. A method of recording and reproducing information according to claim 1, further comprising receiving the information via a camera or laser.

7. A method of recording and reproducing information according to claim 1, wherein the liquid crystal content of said information recording medium is 10 to 80 percent by weight.

8. A method according to claim 1, wherein said recording medium further comprises an electrically insulating charge carrier layer on its surface.

9. A method according to claim 1, wherein said recording medium further comprises a charge block layer adjacent the information recording layer.

* * * * *